United States Patent
Mortson (10) Patent No.: US 7,604,724 B2
(45) Date of Patent: Oct. 20, 2009

(54) METHOD FOR SOUR GAS TREATMENT

(75) Inventor: Murray Edward Arne Mortson, Chestermere (CA)

(73) Assignee: Aristos Energy Inc., Calgary (CA)

( * ) Notice: Subject to any disclaimer, the term of this patent is extended or adjusted under 35 U.S.C. 154(b) by 0 days.

(21) Appl. No.: 12/166,977

(22) Filed: Jul. 2, 2008

(65) Prior Publication Data

US 2009/0035199 A1 Feb. 5, 2009

Related U.S. Application Data

(60) Provisional application No. 60/947,920, filed on Jul. 3, 2007.

(51) Int. Cl.
*B01D 61/42* (2006.01)
*B01D 61/44* (2006.01)

(52) U.S. Cl. .............. 204/522; 204/523; 204/534; 204/537; 423/220

(58) Field of Classification Search ............... 423/210, 423/220, 221, 222, 224, 225, 226, 242.1, 423/246.01, 246.04, 243.08, 243.09, 243.1, 423/244.01, 244.07; 204/522, 521, 523, 204/534, 531, 538, 537
See application file for complete search history.

(56) References Cited

U.S. PATENT DOCUMENTS

| | | | |
|---|---|---|---|
| 3,523,880 A | 8/1970 | Parsi | |
| 3,542,657 A | 11/1970 | Mindler et al. | |
| 3,607,001 A | 9/1971 | Finfer et al. | |
| 3,821,110 A * | 6/1974 | Luetzelschwab | ............. 210/63 |
| 4,191,620 A | 3/1980 | Young et al. | |
| 4,836,992 A | 6/1989 | Rickert et al. | |
| 5,098,532 A | 3/1992 | Thompson et al. | |
| 5,149,460 A | 9/1992 | Olson et al. | |
| 5,228,962 A | 7/1993 | Mani et al. | |
| 5,324,403 A | 6/1994 | Kennedy et al. | |
| 5,344,529 A | 9/1994 | Stauffer | |
| 5,888,368 A | 3/1999 | Posar | |
| 5,928,488 A | 7/1999 | Newman | |
| 6,083,472 A | 7/2000 | Nagl et al. | |
| 6,132,590 A | 10/2000 | Moran et al. | |
| 6,210,583 B1 * | 4/2001 | Kurukchi et al. | ............ 210/638 |
| 6,527,932 B1 | 3/2003 | Botzem et al. | |
| 6,554,990 B1 | 4/2003 | Nicolas et al. | |
| 2006/0000713 A1 | 1/2006 | Carus, III et al. | |

FOREIGN PATENT DOCUMENTS

| CA | 2048815 | | 11/1992 |
|---|---|---|---|
| CA | 2048815 C | * | 12/1997 |

* cited by examiner

*Primary Examiner*—Wayne Langel
*Assistant Examiner*—Syed Iqbal
(74) *Attorney, Agent, or Firm*—Bennett Jones LLP (57) ABSTRACT

A method for selectively removing hydrogen sulfide and carbon dioxide from sour gas by reacting the hydrogen sulfide and carbon dioxide in the sour gas with sodium hydroxide is disclosed. Also disclosed is a process for the production of a salt product from a sour gas stream. The reaction with sodium hydroxide creates a scrubber solution comprising water, hydrocarbons, contaminants and salts. The scrubber solution may be oxidized, filtered and can then be subjected to electrodialysis. Ammonia is introduced into the acid compartments of the cell. Sodium hydroxide and a salt product comprising ammonium sulfate or ammonium thiosulfate with ammonium bicarbonate, ammonium carbonate, ammonium carbamate may be produced. The regenerated sodium hydroxide may be used to sweeten further sour gas. The salt product may be used as a fertilizer.

20 Claims, 3 Drawing Sheets

H2S and CO2 Removal Relationship with Fresh Caustic and Gas Flow Rate

FIG. 4

METHOD FOR SOUR GAS TREATMENT

FIELD OF THE INVENTION

The present invention relates to a method of sour gas treatment, and in particular, a method for selectively removing hydrogen sulfide with minimal carbon dioxide absorption from the sour gas by scrubbing the gases with a sodium hydroxide solution. Further, this invention relates to a process for producing salts such as ammonium sulfate or ammonium thiosulfate.

BACKGROUND OF THE INVENTION

A number of different processes are currently in use to remove or scrub hydrogen sulfide ($H_2S$) and carbon dioxide ($CO_2$) from sour natural gas. Generally, these processes are also capable of removing carbonyl sulfide (COS), carbon disulfide ($CS_2$) and mercaptans (RSH—where R is any radical). The processes include chemical and physical processes, batch processes, molecular sieve processes and membrane separation processes.

Caustic (sodium hydroxide) has traditionally been used to carry out a fine purification of the gas after the coarse treatment of a natural gas stream by a chemically or a physically regenerable solvent. Conventionally, a caustic solution countercurrently contacts with a sour gas mainly containing $H_2S$ and $CO_2$ in a packed or trayed column. When $CO_2$ is present, the sodium hydroxide solution will absorb $CO_2$ as well as $H_2S$ without preference. This leads to high caustic consumption and the spent solution has to be neutralized by acid for disposal.

The chemical reactions involved in caustic scrubbing are as follows:

$$NaOH + CO_2 \rightarrow NaHCO_3$$

$$H_2S + NaOH \rightarrow NaSH + H_2O$$

$$NaSH + NaOH \rightarrow Na_2S + H_2O$$

$$H_2S + 2NaOH \rightarrow Na_2S + H_2O$$

$$RSH + NaOH \rightarrow RSNa + H_2O$$

$$CO_2 + 2NaOH \rightarrow NaCO_3 + H_2O$$

$$CS_2 + 2NaOH \rightarrow 2NaHS + CO_2$$

The scrubbing liquors contain mixtures of sodium hydrosulfide, sodium bicarbonate, sodium carbonate and sodium carbamate in varying amounts. Depending on the composition of the gas which has been scrubbed and the operating conditions of the scrubber, there may be anywhere from 0 to 100% carbonate salts in the scrubbing liquors.

Various options exist to treat the liquors. One option is to fully oxidize the mixture to a mixture of sodium sulfate and sodium bicarbonate. Another option is to partially oxide the scrubbing liquors to a mixture of sodium thiosulfate and sodium bicarbonate. The mixture may then be acidified with sulfuric acid to decompose the bicarbonate to carbon dioxide. This forms a solution which is essentially pure sodium sulfate. The sodium sulfate formed in this way (or the sodium sulfate/sodium bicarbonate mixture) may then be treated in a bipolar cell or an electrochemical cell to regenerate a solution of sodium hydroxide. The regenerated sodium hydroxide may then be recycled to a column or mixer for example to be used for further scrubbing. U.S. Pat. No. 5,098,532 discloses a three compartment electrochemical cell that can be used to produce ammonium sulfate from sodium sulfate. Alternative electrochemical cells may also be used.

Another option for regeneration of caustic is countercurrent contacting of the liquid with 10% sodium hydroxide solution in a packed column. The caustic is regenerated in a stripping column by the addition of open steam or by steam internally generated by a column heating element. The condensate is returned to the stripping column to maintain caustic concentration.

SUMMARY OF THE INVENTION

In accordance with a broad aspect of the invention, there is provided a process for removing hydrogen sulfide and carbon dioxide from a sour gas stream, the process comprising: a) scrubbing the sour gas stream with sodium hydroxide using a static mixer while controlling residence time in the mixer b) separating the gas from the liquid; c) air stripping the liquid portion of the solution from b); d) oxidizing the solution from c) in an oxidizer vessel; e) electrodialysizing the solution from d) to produce a salt product and sodium hydroxide; and f) recirculating the sodium hydroxide to step a).

In accordance with another aspect of the invention, there is a process for removing hydrogen sulfide and carbon dioxide from a sour gas stream, the process comprising: a) scrubbing the sour gas stream with sodium hydroxide; b) oxidizing the solution from a) to produce sodium sulfate and sodium thiosulfate; and c) passing the solution from b) through an electrolytic cell comprising bipolar membranes to produce sodium hydroxide and a salt product.

In accordance with a broad aspect of the invention, there is provided a process for removal of hydrogen sulfide from a sour gas stream and production of a salt product from the sour gas stream, the process comprising: a) removing free water from a sour gas stream; b) scrubbing the sour gas stream with sodium hydroxide using a static mixer while controlling residence time in the mixer; c) separating the gas from the liquid in the solution from step b); d) air stripping the liquid portion of the solution from c); e) oxidizing the solution from d) in an oxidizer vessel; f) filtering the solution from e); g) electrodialysizing the solution from f) to produce a salt product and sodium hydroxide; and h) recirculating the sodium hydroxide to step b).

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention is intended to treat sour gas. The present process may be carried out in whole or in part at the wellhead of a sour gas well and may for example be used at an isolated gas well away from a central gas processing system in a commercially viable manner. With that in mind, FIG. 1 is a schematic representation of an entire process, including both the portion of the process that may occur at a well site (i.e. until the point of liquid knockout) and that which may occur in a regenerating plant (hydrocarbon removal to electrochemical separation).

Figure 1:
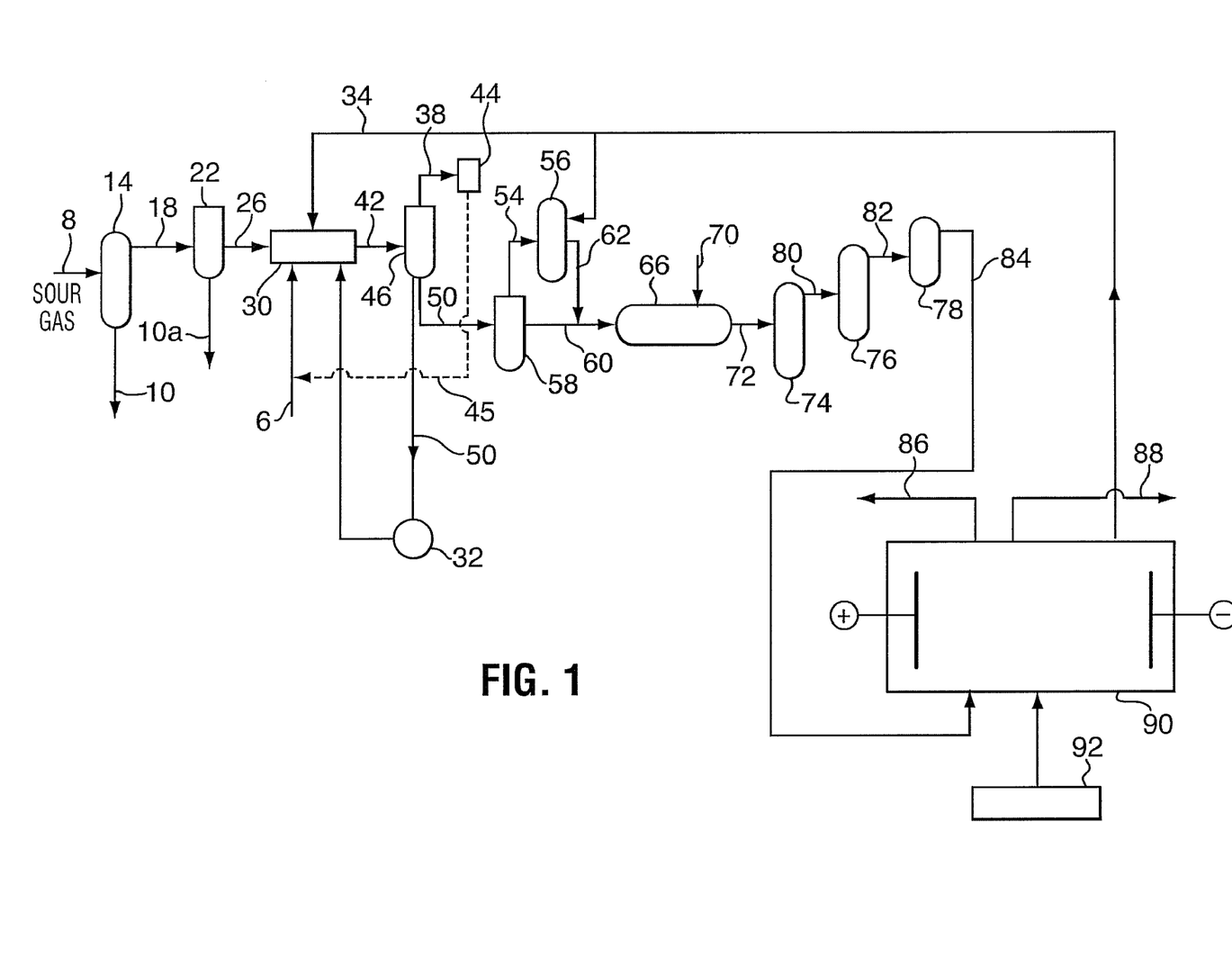
FIG. 1 is a schematic view of a process for treating sour gas.

With reference to FIG. 1, sour gas 8 from a natural gas well containing hydrogen sulfide, carbon dioxide and mercaptans and other sulfur compounds such as carbonyl sulfide and carbon disulfide is typically saturated with formation water. The excess water may be separated from the gas in various ways for example with a free water knockout 14. Liquid slugs 10 may be sent to disposal or re-injection into an abandoned gas well. Saturated gas with minimal free water 18 may then be sent through a filter 22, which may be for example a coalescing filter, for maximum gas liquid separation. The gas leaving 26 the coalescing filter 22 may be saturated, but there is not expected to be any free water in the gas. Any liquid remaining following this filtration 10a may be removed for disposal or re-injection into an abandoned gas well.

Saturated sour gas 26 which may contain methane and heavier hydrocarbons, hydrogen sulfide, carbonyl sulfide, carbon disulfide, carbon dioxide and generally no free water is contacted with either recycled sodium hydroxide solution 34 or fresh sodium hydroxide solution 6 or some combination thereof. The gas may be contacted with the sodium hydroxide for example in an in-line mixer 30 or other device such as a column, absorption tower, etc. The sodium hydroxide may be from various sources. As will be described in more detail, the sodium hydroxide may be regenerated from an electrochemical cell 90 for example. Alternately, fresh caustic 6 may be added directly to the mixer 30.

In the illustrated embodiments, the mixer 30 is set up to flash the sour gas quickly enough to be selective on hydrogen sulfide removal. The mixer may be selected for example, to introduce sodium hydroxide as a spray in liquid droplet form to the gas passing there through. The mixer acts as a scrubber, discouraging the $CO_2$ reaction by maximizing gas-liquid mass transfer rates while minimizing the retention time for the reaction. This combination strongly favors the reaction of $H_2S$ with caustic over the reaction of $CO_2$ with caustic. Carbon dioxide reacts with sodium hydroxide solution which results in large sodium hydroxide usage. There is, however, a minimum $CO_2$ pick up required to provide for the required sodium carbonate, sodium bicarbonate and sodium carbamate buffer for the electrochemical cell, as well as to precipitate the metal ions out at the filtration step.

The mixer may be different forms, provided there is a rapid reaction of caustic and sour gas. In one embodiment, the mixer 30 may be a static mixer and may include a series of stationary, rigid elements placed lengthwise in a pipe, for example. These elements form intersecting channels that split, rearrange, and recombine component streams into smaller and smaller layers until one homogeneous stream exists. One possibility is that the mixer is Sulzer SMV-type static mixer available from Sulzer Chemtech for example, although other mixers may also be used. In the mixer, the reaction of $H_2S$ with NaOH is very robust, due to the complete mixing of scrubbing solution with sour gas. There is instantaneous gas/liquid contact when the gas enters the blender.

The liquid to gas ratio of the mixer (L/G ratio) may be about 1) 0.13 to 0.27 $L/Nm^3$ based on fresh caustic that must be added to complete the reaction; or 2)-0.30 $L/Mm^3$ based on the total caustic rate (fresh and recirculated) to the mixer. This value may vary depending on the mixer dimensions and spray nozzle.

Generally, $CO_2$ absorption may be in the range of about 12-17%. Generally, if there is inadequate NaOH to satisfy all the $H_2S$, the $CO_2$ pick up may be very low. A very high $H_2S/CO_2$ ratio may also result in lower $CO_2$ pick up. The operation conditions, including gas-liquid mass transfer rate, retention time, and pH value of spent sorbent, may be optimized to ensure a minimal carbon dioxide reaction. Generally, if the sweet gas is not up to specification, more NaOH may be sprayed into the mixer. The amount of $CO_2$ may be from about 0 to 30% in the inlet gas and from about 0 to 27% in the outlet gas. The pH value of the spent scrubbing solution may be between about 10 to 15. Retention time may be between about 0 and 10 seconds. The mass transfer rate is dependent on gas volume, percentage of $H_2S$ and the percentage of $CO_2$ for example.

The removal of $H_2S$ is mass transfer limited. The reaction rate for $H_2S$ in the aqueous phase may be faster than the mass transfer rate of $H_2S$ into the aqueous phase. In one embodiment, sufficient caustic may be added to stoichiometrically satisfy all the $H_2S$ in the sour gas. About 10% of the $CO_2$ may be captured, with about 5% carry over of NaOH in the scrubber system. In this way, pipeline specifications of <16 ppm may be achieved. Operation at sub-stoichiometric conditions of caustic may reduce consumption by up to 30%. In one embodiment, using the scrubbing technology, a $H_2S$ concentration at the inlet of approximately 1700 ppm may be reduced to about 5-20 ppm at the outlet of the static mixer over a wide range of operating conditions.

The gas and liquid solution 42 is then separated with a second filter 46, which may be a coalescing filter, for example, to generate sweetened gas 38 and scrubber solution 50. The filter may help to prevent contamination of the caustic. Also, the filter 46 may remove liquid droplets of hydrocarbons (along with any other entrained water, etc.).

Sweetened gas 38 with at least a portion of and in some cases all hydrogen sulfide, mercaptans, carbonyl sulfide, carbon disulfide and some carbon dioxide removed is pipelined to market. A portion of the swet gas be analyzed in a gas analyzer 44 which provides feedback 45 to fresh caustic input 6. Scrubber solution 50 containing some heavier hydrocarbons, sodium sulfide, sodium hydrosulfide, sodium bicarbonate, sodium carbonate, sodium hydroxide, carbonyl sulfide, carbon disulfide and miscellaneous contaminants is the liquid dump of filter 46. From the filter 46, part of the scrubber solution may be carried forward, while part of the scrubber solution may be recycled through a caustic recirculation pump 32 for example and returned to mixer 30. This recycling helps to ensure greater reaction between the caustic and sour gas. Hydrocarbons and mercaptans may be removed from the scrubber solution 50 in a stripper 58, which may be an air stripper. Thus, hydrocarbons may be removed from the scrubber solution by stripper 58.

Once air sparged in stripper 58, the hydrocarbons and mercaptans 54 may be scrubbed in a scrubber or column 56 to produce additional sodium sulfate 62 which may be fed to an oxidizer 66. The air-stripped scrubber solution 60 may be pumped to the oxidizer 66 where oxygen 70 may be sparged into the oxidizer under controlled temperature and pressure conditions. For example, pressure conditions of 75-125 psig and 100-160° C. may be used. The solution may be partially oxidized to sodium thiosulfate with sodium bicarbonate, sodium carbonate and sodium carbamate. Alternatively, the scrubber solution may be fully oxidized to sodium sulfate with sodium bicarbonate/sodium carbonate and sodium carbamate. Initially, only partial oxidation from NaHS to $NaS_2O_3$ is achieved. With time, complete oxidation from $NaS_2O_3$ to $Na_2SO_4$ is achieved. Thus, the same concentration of oxygen may be used whether oxidation is full or partial.

Positioning the oxidizer prior to any filtration steps may be useful because the impurities such as Fe, Mn, V, Ca and Mg in trace amounts appear to act as catalysts for oxidation sites, thereby helping to ensure more complete oxidation. The bicarbonate/carbonate/carbamate co-products are important for electrochemical cell operability, as will be discussed below.

The oxidized scrubber solution 72 may undergo a series of filtration steps to remove all organic impurities and metal cations like calcium, magnesium and iron from water recovered in the saturated gas. The order of the filtration steps may be varied, and certain filtration steps such as the second filtration step are optional. The first filter may be a diatomaceous earth filter 74, which could remove any suspended solids including the precipitates of $Ca^{2+}$ and $Mg^{2+}$ and partially organics. A second filtration step 80, which is optional, may be an activated carbon filter 76 to remove any light organics and odors. A third filtration step 82 may be a chelating resin 78 to remove any metal cations. The filtered solution 84 may be pumped into an electrodialysis system 90, which may comprise for example an electrochemical cell and possibly one including a bipolar membrane. Ammonia 92 can be added to the electrodialysis system. The introduced ammonia protects the membrane by preventing back migration of protons into the feed compartment.

In one embodiment, depleted sodium sulfate or sodium thiosulfate 86 may be withdrawn from the electrochemical cell. This depleted solution could be mixed with fresh sodium sulfate or sodium thiosulfate solution in a recycle step. Stream 88 comprises a salt solution. In some embodiments, the salt solution may comprise ammonium sulfate, ammonium thiosulfate, ammonium bicarbonate, ammonium carbonate and ammonium carbamate and mixtures thereof.

Figure 2:
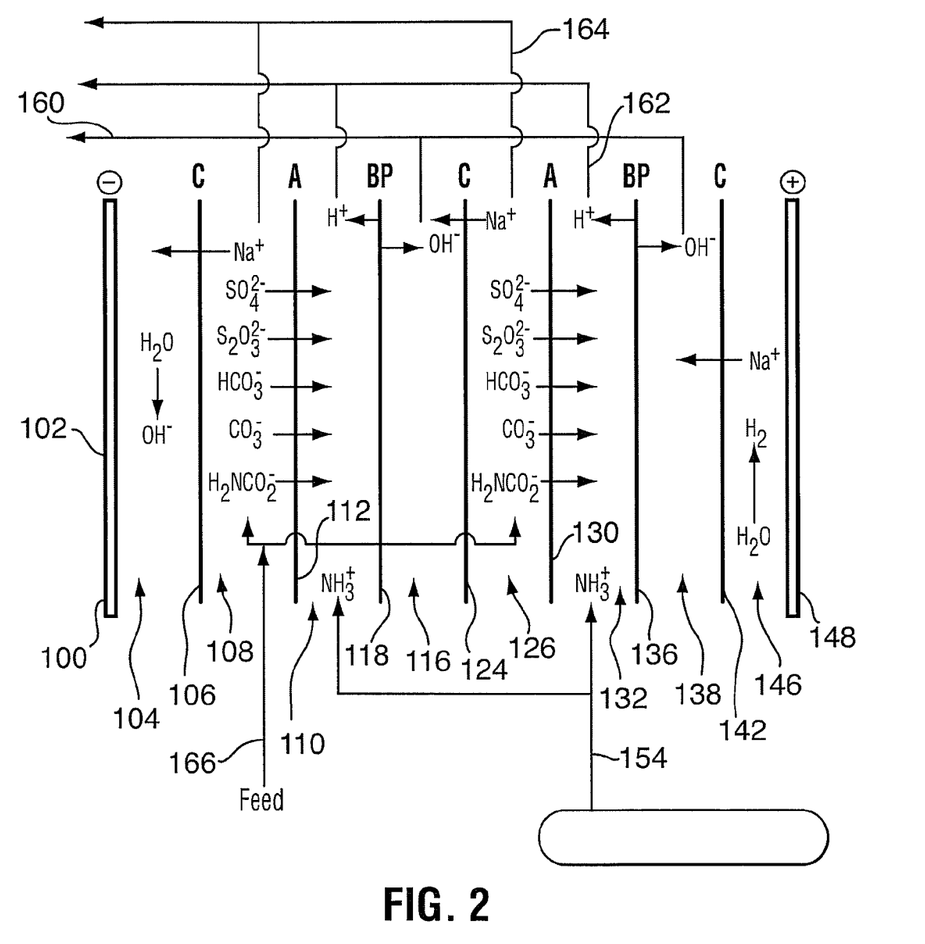
FIG. 2 is a schematic view of a bipolar membrane cell and a process for producing salt from a salt feed.

In one embodiment, the electrochemical cell may be a bipolar electrochemical cell. Referring to FIG. 2, the electrodialysis system 100 can be divided into several compartments, each compartment delineated by membranes or by either a cathode or an anode and a membrane. The solution 166 derived from the scrubbing process can be conveyed into compartments 108 and 126 of the electrochemical system. In the illustrated embodiment, compartment 104 is bounded by cathode 102 and cation membrane (C) 106. Compartments 108 and 126 are bounded by an anion membranes (A) 112, 130 and cation membranes 106, 124. Compartments 110 and 132 are bounded by anion membranes 112, 130, respectively and bipolar membranes 118, 136, respectively. Compartments 116 and 138 are bounded by cation membranes 124, 142, respectively and bipolar membranes (BP) 118, 136, respectively. Compartment 146 is bounded by cation membrane 142 and anode 148. For each bipolar membrane, the anion layer of the bipolar membrane is oriented so that it faces the cathode, while the cation layer is oriented so that it faces the cathode.

To operate the cell, ammonia 154 may be fed into compartments 110 and 132. The introduced ammonia protects the membrane by preventing back migration of protons into compartments 108 and 138. Sodium ions can be transported across cation membranes 106, 124 into compartments 104 and 116. Sulfate ions, thiosulfate ions, bicarbonate ions, carbonate ions and carbamate ions can be transported across anion membranes 112 and 130. Water splitting occurs across the bipolar membranes 118 and 136 resulting in the production of hydrogen ions in compartments 110 and 132; with hydroxide ions being produced in compartments 116 and 138.

The sodium bicarbonate, sodium carbonate, and sodium carbamate product acts as a buffer protecting the integrity of the cell membranes by preventing the hydroxide back migration across the cation membrane. The presence of carbonate/bicarbonate/carbamate in the feed may also help with pH control and ammonium contamination in the feed. First, the bicarbonate may help to buffer the feed solution, keeping the hydroxide concentration low so that it will not compete with sulfate. Secondly, any carbonate in the feed may react with the ammonium in the feed, producing bicarbonate and ammonia. The ammonia may be stripped off and returned for pH control of the "acid" compartment. The key to running this system is to match the inefficiencies for the membranes or at least the flux of ammonium from "acid" to feed to the flux of hydroxide from the base.

In a typical salt split of sodium sulfate, sulfuric acid and sodium hydroxide are produced at low concentrations because of the back migration of protons from the acid compartment. However, by neutralizing the acid produced with ammonia, there is minimal build up of proton and high concentrations of ammonium sulfate can be produced.

Sodium hydroxide 160 may be withdrawn from compartments 104 and 116. The salt product 162, which may be made of a mixture of ammonium sulfate, ammonium thiosulfate, ammonium bicarbonate, ammonium carbonate, and ammonium carbamate can be withdrawn from compartments 110 and 132. The amounts of ammonium bicarbonate, ammonium carbamate and ammonium carbonate produced are dependent on the amount of $CO_2$ pick-up in the mixer. It is possible to halve the amount of bicarbonate in the cell feed by operating the oxidizer in such a manner that the bicarbonate is thermally decomposed to carbonate and carbon dioxide. The percentage of ammonium sulfate or ammonium thiosulfate produced depends on the completion of oxidation stage.

The depleted salt solutions 164 which may be either sodium sulfate or sodium thiosulfate or some combination of these salts, can be withdrawn from compartments 108 and 124. The sodium hydroxide can then be recycled to scrub hydrogen sulfide and carbon dioxide from sour gas. The salt product may contain one of more of the following salts: ammonium sulfate, ammonium thiosulfate, ammonium bicarbonate, ammonium carbonate or ammonium carbamate. The salt product may be separated, evaporated, dried, granulated and sold as a fertilizer product. Using this method, mixtures of 0-99% ammonium sulfate, 0-50% ammonium bicarbonate and 0-30% ammonium carbonate may be produced.

The reactions occurring inside the cell are as follows:

$$Na_2SO_4 \rightarrow 2Na^+ + SO_4^{2-}$$

$$Na_2S_2O_3 \rightarrow 2Na^+ + S_2O_3^{2-}$$

$$NaHCO_3 \rightarrow Na^+ + HCO_3^-$$

$$Na_2CO_3 \rightarrow 2Na^+ + CO_3^{2-}$$

$$NaH_2NCO_2 \rightarrow Na^+ + H_2NCO_2^-$$

The chemistry that takes place in the base side of the cell is:

$$Na^+ + OH^- = NaOH$$

The chemistry that takes place on the acid side of the cell is:

$$2NH_3^+ + 2H^+ + SO_4^{2-} \rightarrow (NH_4)_2SO_4 \text{ or}$$

$$2NH_3^+ + 2H^+ + S_2O_3^{2-} \rightarrow (NH_4)_2S_2O_3 \text{ with}$$

$$NH_3^+ + H^+ + HCO_3^- \rightarrow NH_4HCO_3 \text{ plus}$$

$$2NH_3^+ + 2H^+ + CO_3^{2-} \rightarrow (NH_4)_2CO_3 \text{ plus}$$

$$NH_3^+ + H^+ + H_2NCO_2^- \xrightarrow{NH_2} COONH_4$$

The combined result of the above processes may be the production of a salt stream comprising predominantly either ammonia sulfate or ammonium thiosulfate. Additional components of the salt stream can be ammonium carbonate, ammonium bicarbonate, and ammonium carbamate. The components of the salt stream may be separated.

Figure 3:
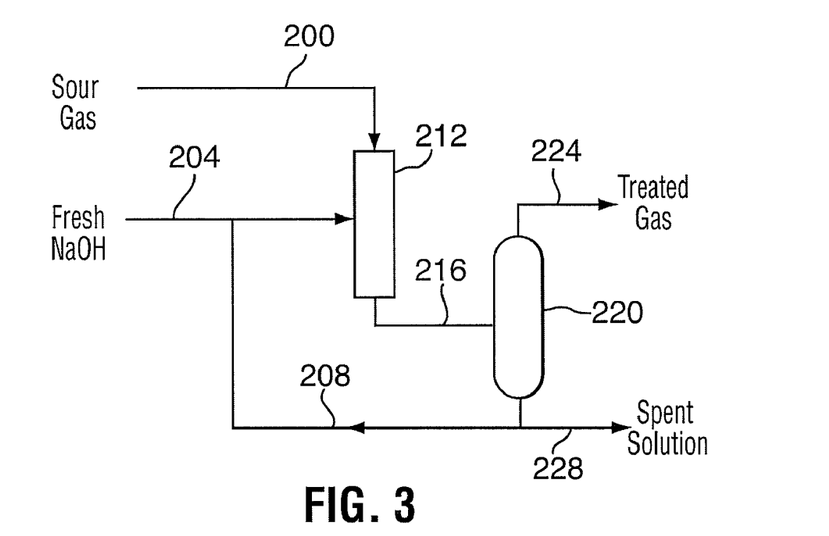
FIG. 3 is a schematic representation of an arrangement for conducting scrubbing tests.

Referring to FIG. 3, a possible arrangement for conducting scrubbing tests is shown. The test arrangement is described in more detail in Example 1. Sour gas 200 can be fed into an inline mixer 212. Fresh sodium hydroxide 204 may be sprayed into the sour gas which ensures that the desired hydrogen sulfide reaction occurs with minimal carbon dioxide uptake. Recycled caustic 208 can also be sprayed into the in-line mixer. The solution 216 emerging from the in-line mixer can then be fed into a coalescing filter 220. The spent scrubber solution 228 and treated gas 224 emerge from the coalescing filter 220.

EXAMPLE 1

Operating Systems

Sour gas from an operating sour gas well was scrubbed. The scrubbing process used a static mixer as a scrubber in contrast to a trayed vessel traditionally used for bulk $H_2S$ removal with sodium hydroxide. An inlet caustic stream was sprayed into the sour gas, with minimal retention time allowed. Tests were conducted to determine if a $H_2S$ reaction occurs with minimal $CO_2$ uptake, which may be due to a higher rate of mass transfer of $H_2S$ into the aqueous phase.

The major process variable values were recorded for each set of test conditions. The acid gas composition of the treated gas was recorded through sampling and on-site analysis. The gas flow rate was manipulated between 0.3 to 0.9 MMSCFD. The fresh caustic flow rate was manipulated between 0.5 to 1.2 USGPM. The total liquid flow rate to scrubber may be between 0.7 to 1.4 USGPM. Once the supplied NaOH to gas flow ratio goes beyond about 0.6 gmol $OH/m^3$ gas, there may be little benefit in $H_2S$ removal. If the supplied NaOH to gas flow ratio is smaller than about 0.45 gmol $OH/m^3$ gas, sufficient $H_2S$ removal for pipeline specifications may be achieved at sub-stoichiometric conditions, which optimizes caustic consumption.

The scrubbing technology was able to reduce $H_2S$ concentration from 1700 ppm at the inlet to 5-20 ppm at the outlet of the static mixer over a wide range of operating conditions. The few tests wherein $H_2S$ exceeded the pipeline specification of 16 ppm were a result of attempting to determine the operating limits for the technology. In order to reduce the level of $H_2S$ at the outlet to less than 16 ppm, the L/G ratio was manipulated to about 0.3. $CO_2$ absorption was in the range of about 12-17%. The $CO_2$ pick up was adequate for providing the compounds necessary for cell buffering.

The process proved to be very robust, which indicates it will be very appropriate for unmanned well sites. The scrubbing tests assessed the basic operability of the equipment and provided the foundation for the "proof of concept".

The present invention will be most economical when the circulation rate of caustic through all the process elements is minimized (i.e. a minimum amount of caustic is used). In one embodiment, the fresh caustic flow rate may be about 0.5 to 1.2 USGPM. The total liquid flow rate to the scrubber may be about 0.7 to 1.4 USGPM for example. The mixer/scrubber technology tested in this work was designed to discourage the $CO_2$ reaction by maximizing gas-liquid mass transfer rates while minimizing the retention time for the reaction. This combination strongly favors the reaction of $H_2S$ with caustic over the reaction of $CO_2$ with caustic. There is, however, a minimum $CO_2$ pick up required to provide for the required sodium carbonate, sodium bicarbonate and sodium carbamate buffer for the electrochemical cell.

The goal of the scrubber was to selectively remove almost all of the $H_2S$ from the feed natural gas by reaction with NaOH solution. Almost all of the $H_2S$ reacted with caustic (1700 ppmv in the inlet gas, down to 10 ppmv in the outlet gas), while only about 15% of the $CO_2$ reacted with caustic (2.78 mol % in inlet gas, 2.35 mol % in the treated gas). The $H_2S$ reduction was adequate to meet commercial sweet gas specifications and the $CO_2$ pick up was enough to provide the carbonate, bicarbonate, and carbamate ions required for the electrochemical portion of the present invention. Table 1 shows the operating conditions, the resulting outlet $H_2S$ and $CO_2$ concentrations and the amounts of $Na_2S$, $Na_2CO_3$, $NaHCO_3$ and $NaHS$ produced under those operating conditions before the solution is oxidized.

TABLE 1

Operating Conditions and Results Obtained in a Sample Test.

| | | |
|---|---|---|
| Test No. | | 5 |
| Date and Time (Approx.) | | Jan. 19, 2006 12:10 PM |
| Gas Temperature | ° C. | 6.8 |
| System Pressure | kPag | 2385 kPag |
| Gas Flow Rate | MMSCFD | 0.59 |
| | gmol/min | 3.876 |
| Fresh Caustic Flow | USGPM | 0.46 |
| (mean) | gmol/min | 3.876 |
| Recycle Caustic Flow (mean) | USGPM | 0.92 |
| M-900 Caustic Flow (total) | USGPM | 1.38 |
| Inlet $H_2S$ Conc. | ppm | 1700 |
| Inlet $CO_2$ | mol % | 2.76 |
| Outlet $H_2S$ Conc. | ppm | 13.03 |
| Outlet $CO_2$ Conc. | mol % | 2.32 |
| Outlet NaOH pH | pH | 10.95 |
| NaOH mg/L | mg/L | 37 |
| NaHS mg/L | mg/L | 26817 |
| $Na_2S$ mg/L | mg/L | 33 |
| $Na_2CO_3$ mg/L | mg/L | 52245 |
| $NaHCO_3$ mg/L | mg/L | 63768 |
| pH | — | 10.97 |

The results show that the system is robust enough to operate successfully at an inlet flow rate lower than 1 USGPM without having adverse effects on process efficiency. Further, the results show that comfortable $H_2S$ removal may be achieved while optimizing fresh caustic consumption.

The intent of the sample test was to evaluate whether a larger liquid flow rate through the inlet spray nozzle and scrubber itself had any impact on the scrubbing efficiency of the system. However, the fact that $H_2S$ exceeded spec on the outlet gas required an adjustment to the fresh caustic rate to try to meet specifications. Thus, a test was conducted, the purpose of which was 2-fold:

to operate at the optimized conditions as a result of the rest of the experiments; and to establish the effects of increased overall scrubbing liquor to the nozzle spray on Static Mixer/Scrubber M-900.

Figure 4:
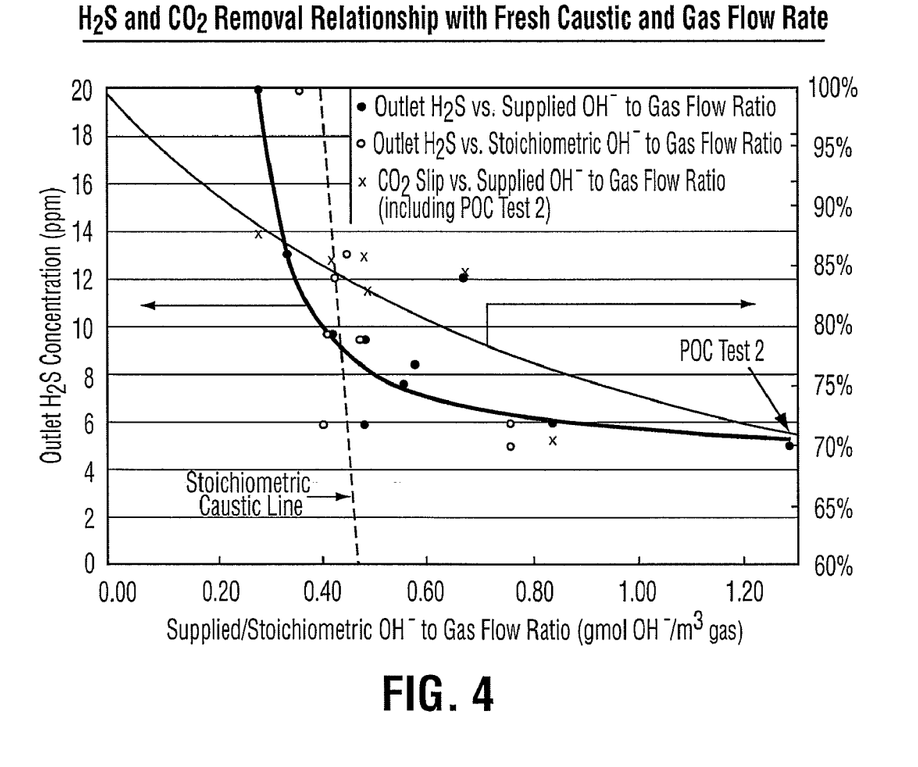
FIG. 4 is a graph showing outlet $H_2S$ concentration and supplied/stoichiometric sodium hydroxide ion to gas flow ratio.

As shown in FIG. 4, the outlet $H_2S$ concentration of the gas follows one uniform trend line across all of the data points that were collected in the field study. This reinforces the prediction that removal of $H_2S$ is mass transfer limited. The reaction rate for $H_2S$ in the aqueous phase was faster than the mass transfer rate of $H_2S$ into the aqueous phase. Once the supplied NaOH to gas flow ratio goes beyond 0.6 gmol $OH/m^3$ gas, there was little benefit in $H_2S$ removal. If the supplied NaOH to gas flow ratio was smaller than 0.45 gmol $OH/m^3$ gas, sufficient $H_2S$ removal for pipeline specifications can be achieved at sub-stoichiometric conditions, which optimizes caustic consumption. Operation at sub-stoichiometric conditions of caustic reduced consumption by up to 30% for the case that was investigated.

EXAMPLE 2

Oxidation System

Tests were designed to determine the basic process parameters for the partial oxidation to a sodium thiosulfate solution and the total oxidation to sodium sulfate solution. The objectives were to determine a practical, high performance and relatively cost effective process to oxidize the caustic scrubber solution to form either sodium sulfate ($Na_2SO_4$) or sodium thiosulfate ($Na_2S_2O_3$) and to feed these salts to an electro dialysis process downstream.

Oxidation Data

Two oxidation tests were performed in a continuous stirred tank reactor (CSTR) with a Robin agitator at a pressure of 100 psig and a temperature of 130° C. The CSTR reactor is scalable to a commercial unit.

Test 1 was performed with a batch of synthetic liquor made from reagent grade sodium carbonate, bicarbonate and sulfide. The pH of the starting solution was 13. Oxidation of the synthetic solution produced the results is shown in Table 2 below. Batch oxidation to sulfate was, within the limited of analytical accuracy, complete and rapid (less than 30 minutes).

TABLE 2

Synthetic Liquor Oxidation Results

| Run | Reaction Time | Sodium Sulfide $Na_2S$, g/L | Sodium Sulfite $Na_2SO_3$, g/L | Sodium Thiosulfate $Na_2S_2O_3$, g/L | Sodium Sulfate $Na_2SO_4$, g/L | Total Sulfur S, g/L |
|---|---|---|---|---|---|---|
| 2 | 0 | 31.6 | <0.02 | 0.91 | 0.59 | 13.0 |
| 2 | 45 | <0.04 | <0.02 | 0.083 | 65.3 | 13.7 |
| 2 | 55 | <0.04 | <0.02 | 0.083 | 66.1 | 13.8 |
| 2 | 65 | <0.04 | <0.02 | 0.083 | 65.2 | 13.6 |

TABLE 2-continued

Synthetic Liquor Oxidation Results

| Run | Reaction Time | Sodium Sulfide $Na_2S$, g/L | Sodium Sulfite $Na_2SO_3$, g/L | Sodium Thiosulfate $Na_2S_2O_3$, g/L | Sodium Sulfate $Na_2SO_4$, g/L | Total Sulfur S, g/L |
|---|---|---|---|---|---|---|
| 3 | 0 | 31.8 | <0.02 | 0.87 | 0.64 | 13.1 |
| 3 | 10 | <0.04 | <0.02 | 14.5 | 44.7 | 14.1 |
| 3 | 20 | <0.04 | <0.02 | 0.083 | 67.7 | 14.1 |
| 3 | 30 | <0.04 | <0.02 | 0.083 | 68.0 | 14.0 |

Test 2 was performed on a batch of "real" scrubbing liquor sampled from Example 1. Prior to the oxidation, additional caustic (72.5 gpl of 30% caustic) was spiked to raise the pH to 13.0. Results of the spiked liquor oxidation are shown in Table 3 below.

TABLE 3

Spiked Liquor Oxidation Test Results

| Reaction Time | Sodium Thiosulfate, $Na_2S_2O_3$ g/L |
|---|---|
| 0 | 0.83 |
| 10 | 17.9 |
| 20 | 4.78 |
| 30 | 1.59 |
| 40-A | 0.91 |
| 40-B | 0.83 |

The residual thiosulfate of 0.83 gpl at time 40 minutes is believed to demonstrate that the reaction has gone to completion, particularly since the starting thiosulfate number also analyses to 0.83 g/L.

In order to shorten the required time, either multiple, continuous stirred tank reactors (CSTRs), or the combination of a front end CSTR with a downstream plug flow device may be needed.

The work has shown that complete oxidation may be obtained at the selected temperature 130° C. and pressure 100 psig with an appropriate reactor combination.

EXAMPLE 3

Filtration System

The overall objective of the research on filtration systems was to determine the effect of preliminary pre-treatment/filtration on the concentration of select chemical components in the scrubber solution. The most important components to remove were the metal hardness cations: calcium, magnesium, and iron.

A two stage filtering regime, first using a diatamateous earth (DE)+activated carbon (AC) filter bed and second with a 0.45 micron polishing filter (CH) under vacuum was used to filter all solutions after treatment. In addition, Amberlite IRC-747 treatment, either alone or with DE and AC was used.

The effect of the filtration system on the calcium, magnesium, iron, manganese, potassium, and sodium cation is included in Table 4. Amberlite IRC-747 was used. Amberlite IRC-747 is a polymer-based chelating resin widely used for metal removal and recovery in mining and chemicals, ground water remediation, waste water treatment, and brine softening. Amberlite IRC-747 presents high selectivity for Fe, Sr, Ca, Ba and Mg, with very low leakage of barium.

TABLE 4

Effect of Filtration Systems on Metal Ions in Scrubber Solutions

| Final Filtration Results Analyte | Unit | Initial Sample Untreated | Precipitation Sample Untreated Result | CH Treated Result | IRC* Treated Result | DE + AC Treated Result | DE + AC + CH 100 Treated Result | DE + AC + IRC 747 Treated Result |
|---|---|---|---|---|---|---|---|---|
| Calcium | mg/L | 40 | 6.2 | 1 | 1 | 4.2 | 1 | 1 |
| Hardness | mg/L | | <200 | <200 | <200 | <200 | <200 | <200 |
| Iron | mg/L | 16 | 2.1 | 2.4 | 0.2 | 3.9 | 0.2 | 2.6 |
| Magnesium | mg/L | 20 | 4 | 4 | 4 | 4 | 4 | 4 |
| Manganese | mg/L | <1 | <1 | <1 | <1 | <1 | <1 | <1 |
| Potassium | mg/L | <80 | <80 | <80 | <80 | <80 | <80 | <80 |
| Sodium | mg/L | 62000 | 67100 | 64300 | 64600 | 58700 | 61100 | 61100 |

*IRC = Amberlite IRC-747

Without treatment, the select cations, calcium, magnesium and iron decreased substantially (>80%) likely from precipitation overtime. With treatment, there was a significant additional decrease in calcium and iron for the single Amberlite IRC 747 and the combination DE+AC+CH treatments. The magnesium concentration remained constant in all treatment regimes.

EXAMPLE 4

Electrochemical Cell System

Experiments using sodium sulfate have shown the concentrations of caustic and ammonium sulfate that can be produced from the process along with estimates for current efficiencies and water transport properties using these concentrations.

It was shown that a sodium thiosulfate salt split is possible with bipolar membranes. When acidified, thiosulfate decomposes into sulfur and sulfite (bisulfite) and in the experiments performed, some sulfur was produced in the cell near the bipolar membrane, where the protons are formed. At lower current density, this seems to only occur in possible low flow areas of the cell, with sulfur deposits occurring mostly around the corners away from the flow inlet and outlet.

A laboratory scale electrodialysis (ED) setup was utilized. The ED stack was an ESC Model ED-1-BP electrodialysis cell with an individual active ion exchange membrane area of 100 cm². The cell is a filter-press design comprising of steel endplates plastic end frames, a stainless steel 316 cathode, a platinized titanium anode, and a series of spacers with polypropylene turbulence mesh for the flow compartments. The cell was bolted together to properly seal the stack and avoid internal or external leaks. Four solution flows were fed to the cell: feed, acid, base and rinse. For these experiments, the feed was 4 liters of either sodium sulfate or sodium thiosulfate and was standardized to an initial concentration of 1.5 M, which is close to solubility limit of sodium sulfate at room temperature.

The "acid" compartment produces the ammonium sulfate or thiosulfate product. As the splitting process goes into the electrochemical cell, the concentrations of ammonium sulfate or ammonium thiosulfate in the acid compartment increases from 1.5 M to 3.0 M. Finally, the base compartment was normally started at low concentrations (0.4 M/1.5%) and allowed to increase up to a maximum of 2.6 M (9%).

The electrode reactions were as follows:

Anode: $2H_2O \rightarrow 4H^+O_2 + 4\bar{e}$

Cathode: $2\bar{e} + 2H_2O \rightarrow 2OH^- + H_2$

Overall: $2H_2O \rightarrow O_2 + 2H_2$

The cell had 5 sets of membranes. Neosepta AHA membrane was used for the anion exchange membrane and BP-1 was used for the bipolar membrane for all experiments. Two different cation membranes were used; Nafion 115 was used in initial experiments and Neosepta CMB was used for comparison.

The rest of the electrodialysis setup consisted of four solution reservoirs for feed, "acid", base and electrode rinse streams, corresponding centrifugal drive pumps for solution recirculation, tubing, fittings and valves. Instrumentation included pH, temperature and flow measurement for the feed and "acid" and flow for the base. Feed and acid pHs were controlled by automatically using electricity activated valves to allow introduction of 50% sulfuric acid and ammonia, respectively. The acid reservoir was water jacketed which allowed temperature control at 40° C. A DC power supply capable for 10 amps and 25 volts output was used to control the process and a battery cycler was used to record data.

A series of experiments were performed to determine the effect of running the salt split at different concentrations of base and acid. In the first experiments, sulfuric acid was used and pretreated with ammonia to a specific pH set point, to produce ammonium sulfate. The first set of experiments also used Nafion 115 as the cation exchange membrane. The results are shown in Table 5 below, which gives current efficiencies for the production of caustic and ammonium sulfate for runs, along with a calculation of the number of water molecules associated with the transport of sodium from the feed to the caustic or sulfate from the feed to "acid" compartment.

TABLE 5

Current Efficiencies for the Production of Caustic and Ammonium Sulfate

| Base Initial Final M/% | Base CE % | Base Water Transport Moles/mole Na | "Acid" Initial Final M/% | Acid CE % | Acid Water Transport Moles/mole $SO_4$ | Water Transport From Feed Moles/mole $Na_2SO_4$ |
|---|---|---|---|---|---|---|
| 0/0 1.6/6.14 | 92 | 3.1 | 1.45/17.4 1.93/22.7 | 92 *(94%) | 10.9 | 19.1 |
| 0.4/1.5 1.6/6.0 | 95 | 3.1 | 2.78/31.4 3.24/35.7 | 90 *(93%) | 9.6 | 14.3 |

TABLE 5-continued

Current Efficiencies for the Production of Caustic and Ammonium Sulfate

| Base Initial Final M/% | Base CE % | Base Water Transport Moles/mole Na | "Acid" Initial Final M/% | Acid CE % | Acid Water Transport Moles/mole SO$_4$ | Water Transport From Feed Moles/mole Na$_2$SO$_4$ |
|---|---|---|---|---|---|---|
| 0.4/1.4 2.6/9.3 | 91 | 4.0 | 3.0/33.5 3.18/35.1 | 93 *(92%) | 13.4 | 16.5 |

Current efficiencies (CE) and water transport for sodium sulfate salt split.
*Numbers in parenthesis are efficiencies obtained by using sulfate loss from Feed.

Very high current efficiencies (>90%) were obtained for all experiments for both caustic and ammonium sulfate production. The efficiency of sulfate transport across the AHA membrane was also very good. Our research successfully proved a sodium sulfate salt split using bipolar membrane electrodialysis with high efficiency for the production of 33% ammonium sulfate and 8% caustic at a current density of 100 mA/cm$^2$. An estimated power consumption of 1680 kWhr/metric tonne of caustic was found, which also produces 1.9 metric tonne of ammonium sulfate. Preliminary long-term data showed that the ammonium sulfate end product would contain about 0.1% sodium, which would need to be re-supplied to the system as caustic.

Experiments were conducted on the salt splitting of sodium thiosulfate using a bipolar membrane cell to produce ammonium thiosulfate and caustic. A traditional salt split of sodium thiosulfate was not possible because thiosulfate is unstable in acidic media. It was hoped that by neutralizing the acid produced with ammonia, the pH would be kept high enough to prevent decomposition of thiosulfate to sulfur and sulfite. A similar technique was successful on the salt split of sodium sulfate.

A laboratory scale electrodialysis (ED) setup was utilized. The ED stack for this work was an Eurodia Eur2C-BIP electrodialysis cell with an individual active ion exchange membrane area of 200 cm$^2$ (5 sets of membranes were used). The cell was a filter-press design comprising of steel endplates, plastic end frames, a stainless steel 316 cathode, a platinized titanium anode, and a series of spacers with polypropylene turbulence mesh for the flow compartments. The cell was bolted together to properly seal the stack and avoid internal or external leaks. Four solution flows were fed to the cell: feed, acid, base and rinse. For these experiments, the feed was typically 8 liters of 0.75 M sodium thiosulfate/0.75 M sodium bicarbonate. The "acid" compartment produced the ammonium thiosulfate product, and was mostly run at a start concentration of 1.5 M (20%) ammonium thiosulfate with 0.4 M sodium bicarbonate. Finally, the base compartment was normally started at low concentrations (0.4 M) and allowed to increase up to a maximum of 2.6 M. 2 L were used for both the "acid" and base start solutions.

The electrode reactions are as follows:

Anode: $2H_2O \rightarrow 4H^+ + O_2 + 4\bar{e}$

Cathode: $2\bar{e} + 2H_2O \rightarrow 2OH^- + H_2$

Overall: $2H_2O \rightarrow O_2 + 2H_2$

Combining the anolyte and catholyte maintains pH neutrality in the electrode rinse stream. The cell had 5 sets of membranes. Neosepta AHA membrane was used for the anion exchange membrane, Nafion 115 for the cation membranes and BP-1 for the bipolar membrane for all experiments.

The rest of the electrodialysis setup consisted of four solution reservoirs for feed, "acid", base and electrode rinse streams, corresponding centrifugal drive pumps for solution recirculation, tubing, fittings and valves. Instrumentation included pH, temperature and flow measurement for the feed and "acid" and flow for the base. "Acid" pH was controlled by automatically using electrically activated valves to allow introduction of ammonia. The feed pH was not controlled. The "acid" reservoir was water jacketed which allowed temperature control at 40° C. A DC power supply capable of 10 amps and 25 volts output was used to control the process and an Arbin Battery Cycler was used to record data.

Samples of anolyte (($NH_4$)$_2S_2O_3$) and feed ($Na_2S_2O_3$) were taken at the start and end of each experiment and analyzed for ionic species using a Dionex Ion Chromatograph equipped with either the IonPac CS12A analytical column (for $NH_4^+$ and Na+ species) or the Ionpac AS17 column (for $S_2O_3^{2-}$ and $CO_3^{2-}$ species), CD25 (or CD25A) conductivity detector, and Peaknet 6.3 data acquisition software. Catholyte samples were also analyzed for $NW_4^+$ in this manner.

The results of the tests are shown in Table 6.

TABLE 6

Current Efficiencies and Solution Concentrations for Sodium Thiosulfate Epdm Salt Split

| Run | Current Density (mA/cm$^2$) | Solution | Base Initial Final M/% | Base CE % | "Acid" Initial Final M/% | "Acid" CE % |
|---|---|---|---|---|---|---|
| 617-47 | 40 | Feed: 1.5 M Na$_2$S$_2$O$_3$ "Acid": 1.5 M (NH$_4$)$_2$S$_2$O$_3$ | 0.4/1.5 1.6/5.8 | 83 | 1.5/20.3 1.8/23.7 | 91 thio |
| 617-51 | 40 | Feed: 1.5 M Na$_2$S$_2$O$_3$ "Acid": 1.5 M (NH$_4$)$_2$S$_2$O$_3$ 0.4 M NaHCO$_3$ to both | 0.4/1.5 1.6/6.2 | 76 | 1.5/20.2 1.6/20.9 | 63 thio (12% bicarb) (14% NH$_4$) |
| 617-51A | 50 | Same as 617-51 | 1.6/6.2 2.6/9.6 | 68 | 1.6/20.9 1.9/24.4 | 76 thio (6% |

TABLE 6-continued

Current Efficiencies and Solution Concentrations for Sodium Thiosulfate Epdm Salt Split

| Run | Current Density (mA/cm$^2$) | Solution | Base Initial Final M/% | Base CE % | "Acid" Initial Final M/% | "Acid" CE % |
|---|---|---|---|---|---|---|
| | | | | | | bicarb) (9% NH$_4$) |
| 617-60 | 80 | Feed: 1.5 M Na$_2$S$_2$O$_3$ "Acid": 3.0 M (NH$_4$)$_2$S$_2$O$_3$ 0.4 M NaHCO$_3$ to both | 0.4/1.5 2.6/9.4 | 82-86 | 3.0/38.4 3.2/38.8 | 73-90 thio (6% bicarb) (14% NH$_4$) |
| 617-63 | 80 | Feed: 0.75 M Na$_2$S$_2$O$_3$/0.75 M NaHCO$_3$ "Acid": 1.5 M (NH$_4$)$_2$S$_2$O$_3$/0.4 M NaHCO$_3$ | 0.4/1.6 2.6/9.4 | 86 | 1.4/18.9 1.7/22.4 | 64 thio (24% bicarb) (12% NH$_4$) |

N1215/AHA/BP1.
*Numbers in parenthesis are percentages of current attributable to transport of other species.
Anolyte pH control set point 8.35.
Base start concentration 0.4 M.

Salt splitting experiments where both the feed solution and ammonium thiosulfate product solution were buffered with bicarbonate were performed. The bicarbonate prevented the feed pH from becoming too basic due to hydroxide back migration across the cation membrane. The bicarbonate in the ammonium thiosulfate product was converted to ammonium carbamate (by addition of ammonia) which buffered the acid produced at the bipolar membrane. These additions allowed the production of a mixed ammonium thiosulfate, bicarbonate, and carbamate solution, at maximum commercially allowed current density. Excellent current efficiencies (over 90% for combined thiosulfate and bicarbonate) were obtained.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the invention. Moreover, nothing disclosed herein is intended to be dedicated to the public. No element is to be construed under the provisions of 35 USC 112, sixth paragraph, unless the element is expressly recited using the phrase "means for" or "step for".

I claim:

1. A process for removing hydrogen sulfide and carbon dioxide from a sour gas stream, the process comprising:
   a) scrubbing the sour gas stream with sodium hydroxide using a static mixer while controlling residence time in the mixer;
   b) separating the gas from the liquid in the mixture from step a);
   c) air stripping the liquid portion of the solution from b);
   d) oxidizing the solution from c) in an oxidizer vessel;
   e) electrodialysizing the solution from d) to produce a salt product and sodium hydroxide; and
   f) recirculating the sodium hydroxide to step a).

2. The process of claim 1 wherein the electrodialysizing is carried out in an electrochemical cell comprising bipolar membranes.

3. The process according to claim 1 wherein the salt product comprises one or more salts selected from the group consisting of ammonium sulfate, ammonium thiosulfate, ammonium bicarbonate, ammonium carbonate and ammonium carbamate.

4. The process according to claim 1 wherein the mixer flashes the sour gas quickly enough to be selective on hydrogen sulfide removal and wherein the scrubbing results in carbon dioxide uptake.

5. The process according to claim 1 wherein the stripping further comprises producing hydrocarbons and mercaptans;
   producing flue gas;
   scrubbing the flue gas with sodium hydroxide;
   producing sodium sulfate which is fed to the oxidizer.

6. The process according to claim 1 wherein oxidizing includes the use of metal ions as catalysts.

7. The process according to claim 1 wherein the electrodialysis is carried out in a three compartment electrolytic cell having a cathode compartment and an anode compartment separated by a central compartment bounded by a cation membrane and an anion membrane.

8. A process for removing hydrogen sulfide and carbon dioxide from a sour gas stream, the process comprising:
   a) scrubbing the sour gas stream with sodium hydroxide;
   b) oxidizing the solution from a) to produce sodium sulfate and sodium thiosulfate; and
   c) passing the solution from b) through an electrolytic cell comprising bipolar membranes to produce sodium hydroxide and a salt product.

9. The process of claim 8 wherein the scrubbing is done in at least one of a) a mixer; b) an absorption tower or c) a column.

10. The process of claim 8 further comprising filtering the solution following the oxidizing step in b).

11. The process according to claim 8 wherein the salt product comprises one or more salts selected from the group consisting of ammonium sulfate, ammonium thiosulfate, ammonium carbonate, ammonium bicarbonate and ammonium carbamate.

12. The process according to claim 9 wherein oxidizing includes the use of metal ions as catalysts.

13. A process for removal of hydrogen sulfide from a sour gas stream and production of a salt product from the sour gas stream, the process comprising:
   a) removing free water from a sour gas stream;
   b) scrubbing the sour gas stream with sodium hydroxide using a static mixer while controlling residence time in the mixer and with minimal carbon dioxide pickup;
   c) separating the gas from the liquid in the solution from step b);
   d) air stripping the liquid portion of the solution from c);
   e) oxidizing the solution from d) in an oxidizer vessel;
   f) filtering the solution from e);
   g) electrodialysizing the solution from f) to produce a salt product and sodium hydroxide; and
   h) recirculating the sodium hydroxide to step b).

14. The process according to claims 13 wherein the salt produced comprises one or more salts selected from the group consisting of ammonium sulfate, ammonium thiosulfate, ammonium carbonate, ammonium bicarbonate and ammonium carbamate.

15. The process according to claim 13 wherein the filtering in step f) comprises sequentially passing the solution through a diatomaceous earth filter, an activated carbon filter and a chelating resin.

16. The process according to claim 13 wherein the mixer flashes the sour gas quickly enough to be selective on hydrogen sulfide removal and wherein the scrubbing results in carbon dioxide uptake.

17. The process according to claim 13 wherein the stripping further comprises producing hydrocarbons and mercaptans;
   producing flue gas;
   scrubbing the flue gas with sodium hydroxide;
   producing sodium sulfate which is fed to the oxidizer.

18. The process according to claim 13 wherein oxidizing includes the use of metal ions as catalysts.

19. The process according to claim 13 wherein the electrodialysis is carried out in a bipolar electrodialysis cell.

20. The process according to claim 13 wherein the electrodialysis is carried out in a three compartment electrolytic cell having a cathode compartment and an anode compartment separated by a central compartment bounded by a cation membrane and an anion membrane.

* * * * *